Figure 1:
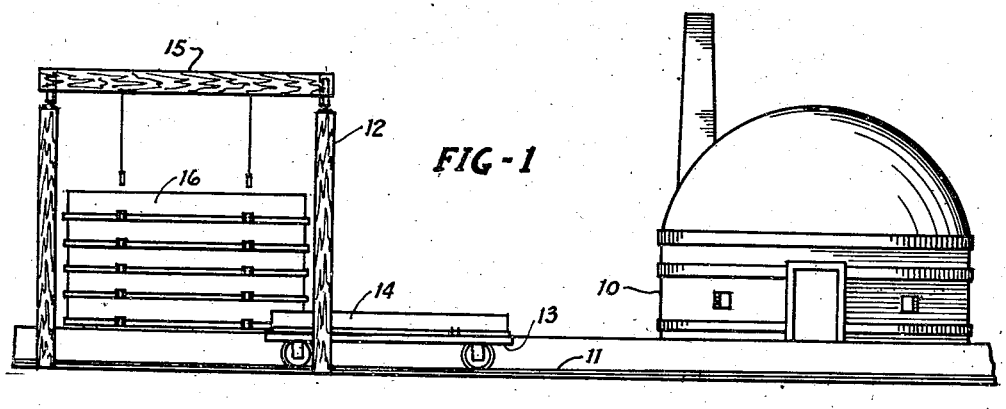

March 24, 1936. B. F. FITCH 2,034,722
APPARATUS FOR HANDLING BRICK
Filed June 9, 1931 5 Sheets-Sheet 1

Inventor
Benjamin F. Fitch
By Bates, Golrick & Teare
Attorneys

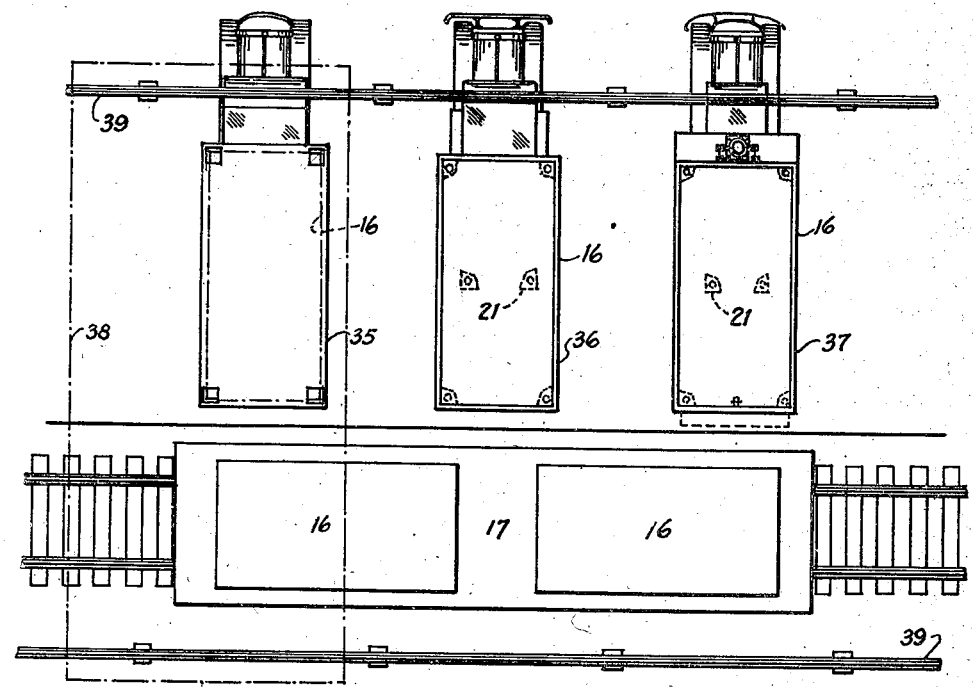
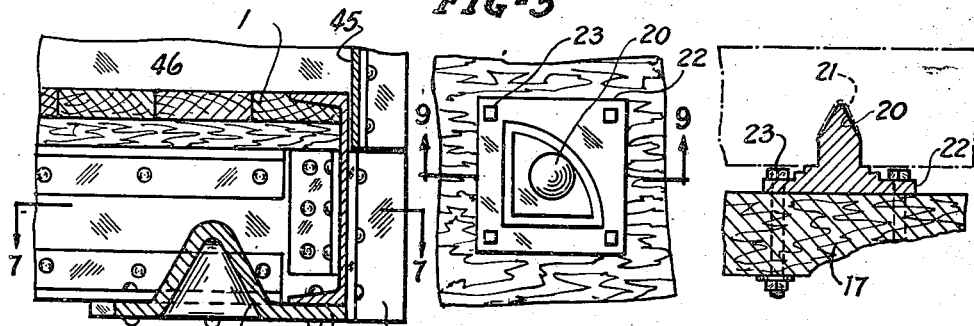
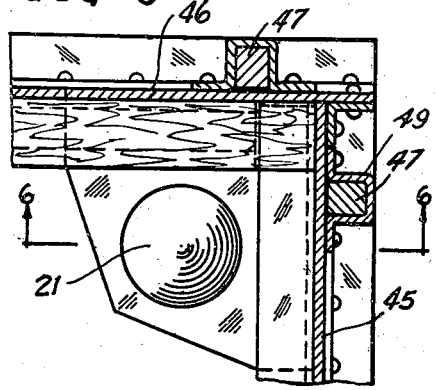

March 24, 1936. B. F. FITCH 2,034,722
APPARATUS FOR HANDLING BRICK
Filed June 9, 1931 5 Sheets-Sheet 4

Inventor
Benjamin F. Fitch
By Bates, Gobrick & Teare
Attorneys

March 24, 1936.  B. F. FITCH  2,034,722
APPARATUS FOR HANDLING BRICK
Filed June 9, 1931  5 Sheets-Sheet 5

Inventor
Benjamin F. Fitch
By Bates Golrick & Jeare
Attorneys

Patented Mar. 24, 1936

2,034,722

UNITED STATES PATENT OFFICE 2,034,722

APPARATUS FOR HANDLING BRICK

Benjamin F. Fitch, Greenwich, Conn., assignor to Motor Terminals Company, Wilmington, Del., a corporation of Delaware Application June 9, 1931, Serial No. 543,117

4 Claims. (Cl. 294—67)

This invention relates to a method and apparatus for handling small articles such as brick, tile and the like and is a continuation in part of my copending application, Serial No. 291,190, filed July 9, 1928 on a System and means for handling brick. Articles such as bricks have heretofore been handled by laborious and cumbersome methods that have increased the labor charge to such extent that the use of brick for building purposes has been greatly restricted. This is particularly true in large cities where ordinances limit the storing capacities on the sidewalk, and where the brick must be transported in various forms of conveyances between the brickyard and the place of use. For example, under the prevailing practice, the brick must be moved by hand from a kiln to a storage yard for seasoning, and then must be loaded by hand onto a truck or railroad car. In some cases, the brick must be transported to a lighter or float, from whence they are again manually transferred to motor trucks and delivered to the job.

The successive handling of the brick obviously increases the breakage. Common brick can be dumped conveniently from a truck, but the breakage which results from such practice is prohibitive for face brick. Furthermore, when the brick are transported by railway cars from one city to another, the space limitations in the car necessitate careful stacking of the brick to avoid breakage by shifting of the load in transit.

An object of the present invention, therefore, is to provide a system of handling small articles, such as brick, in an expeditious manner from the brickyard to the place of use either by rail or barge transportation, with a minimum amount of handling and breakage. In addition, my invention contemplates a system and an apparatus, which will effect marked economies in the time required to handle the brick from the yard to the place of use.

My system contemplates the use of containers of such size that one container comprises a load for a truck. The containers have sides that extend upwardly from the bottom and are so arranged that they can be stacked in superimposed relationship upon a railway car, with each container interlocked with the one below it, while the bottom container is interlocked with the car floor. While the containers are identical in contour, nevertheless they preferably vary somewhat, in accordance with the use for which they are intended. For example, those intended for receiving common brick are provided with a tail gate, which, when opened, enables the brick to be dumped by tilting the container, while those intended for holding face brick have all four side walls rigidly interconnected and removable as a unit from the bottom or platform to facilitate hand removal of the brick.

Where the containers are shipped by railway cars, my system provides for the expeditious removal of the containers to the place of use, or subsequent yard storage, by providing trucks which are equipped to receive the different containers. Overhead crane equipment may be utilized for raising and transporting the containers from the car and depositing them on a truck that is particularly adapted to receive them. In this way, the handling is greatly expedited and the railway car can be immediately returned to the storage yard with empty containers. This eliminates the necessity for storing the car at a siding until the brick are removed by hand.

Figure 2:
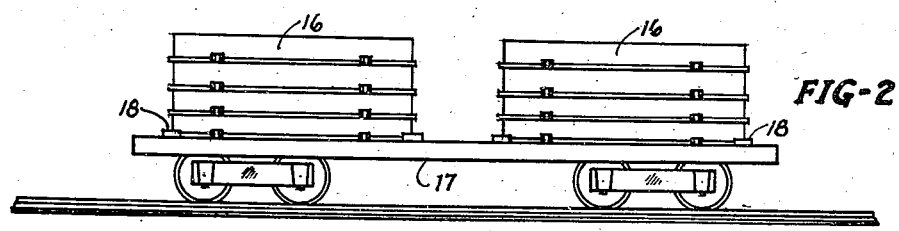
Figure 3:
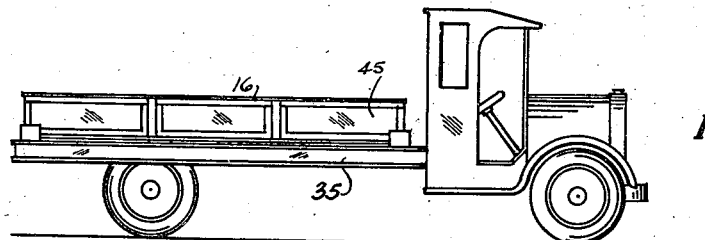
Figure 4:
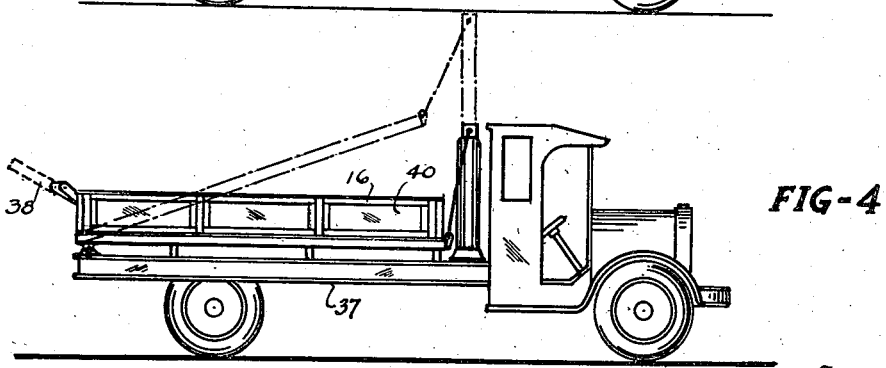
Figure 10:
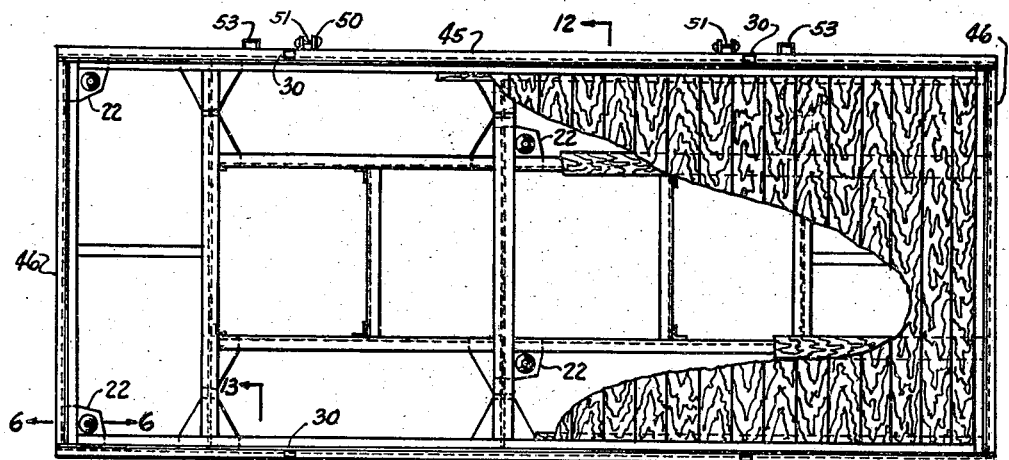
Figure 11:
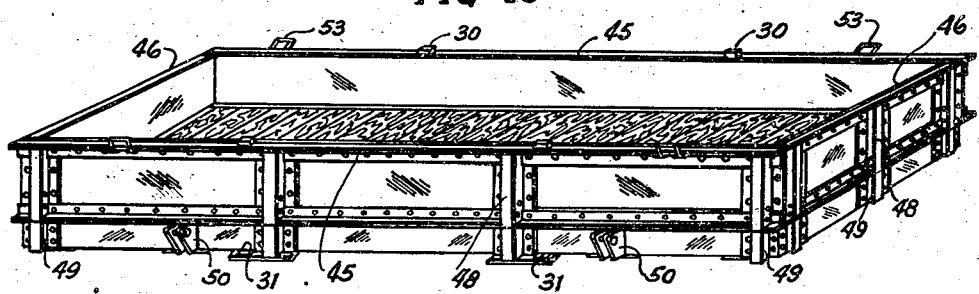
Figure 12:
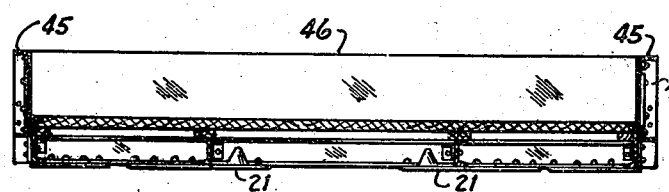
Figure 13:
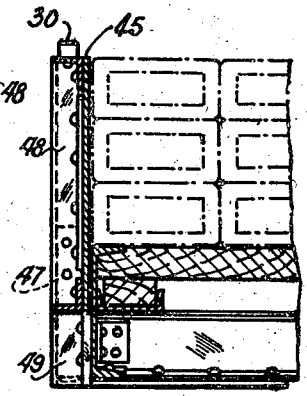
Figure 14:
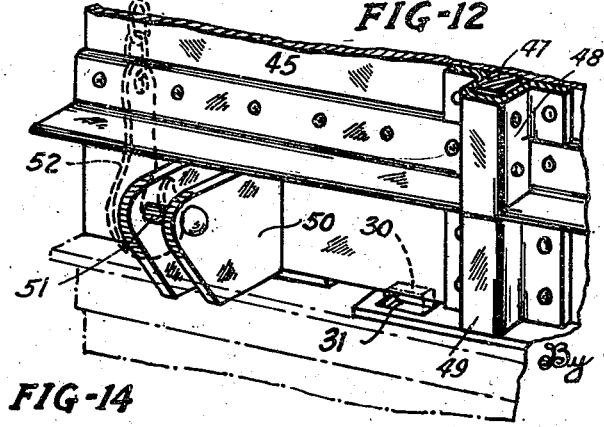
Figure 15:
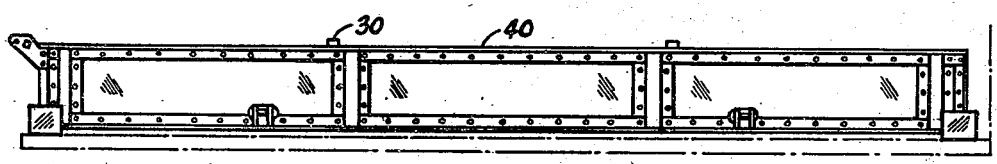
Figure 16:
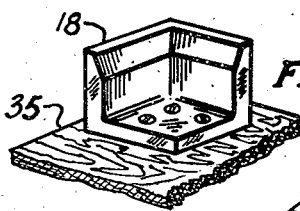
Figure 17:
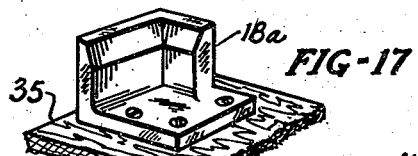
Figure 18:
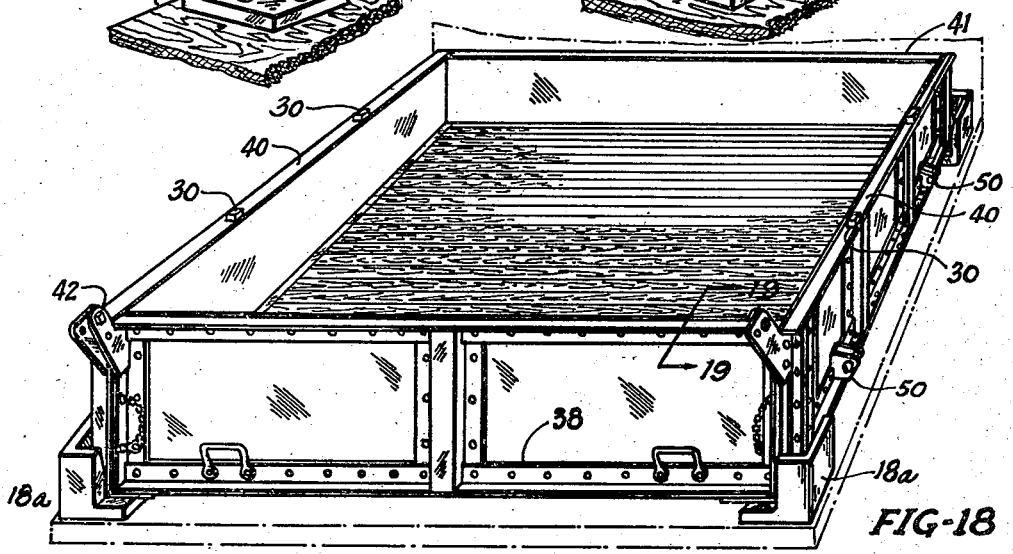
Figure 19:
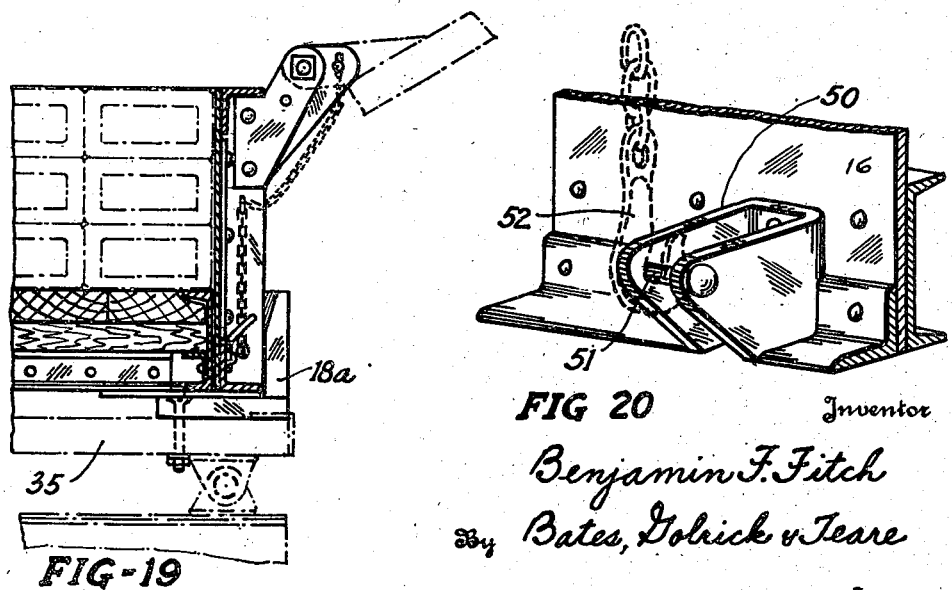
Figure 20:
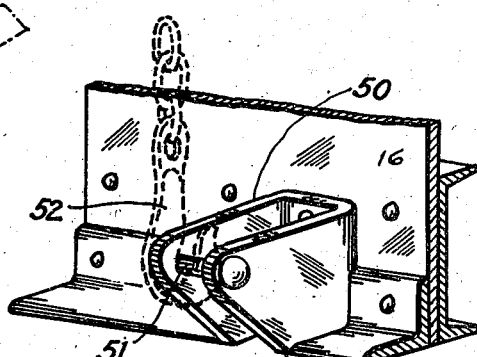
Figure 22:
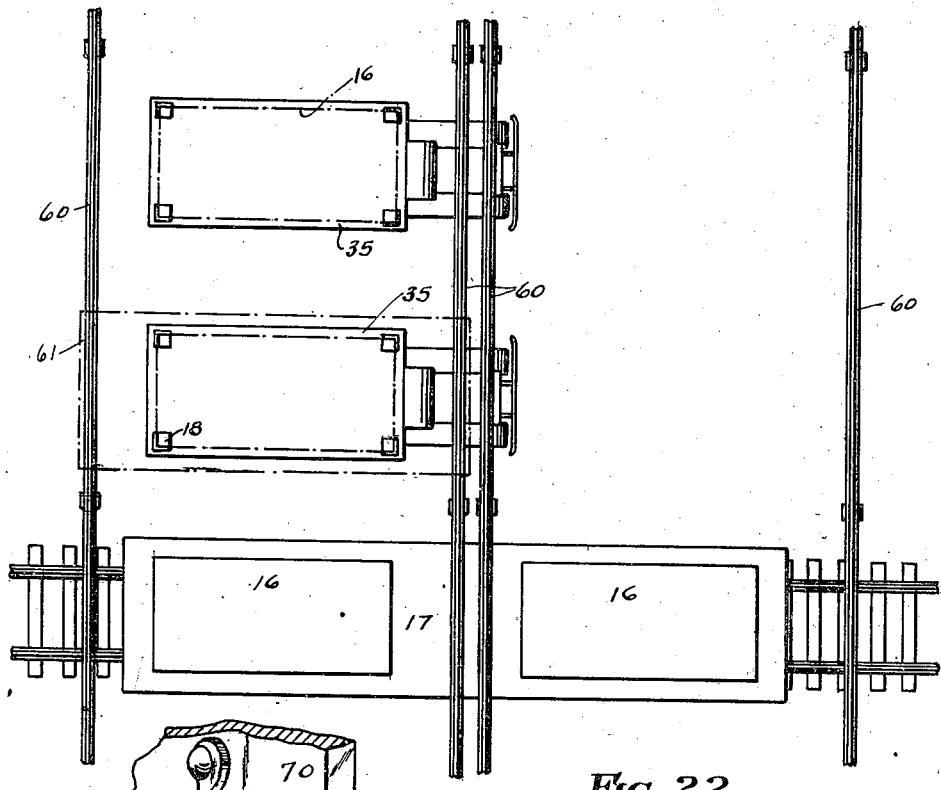
Figure 21:
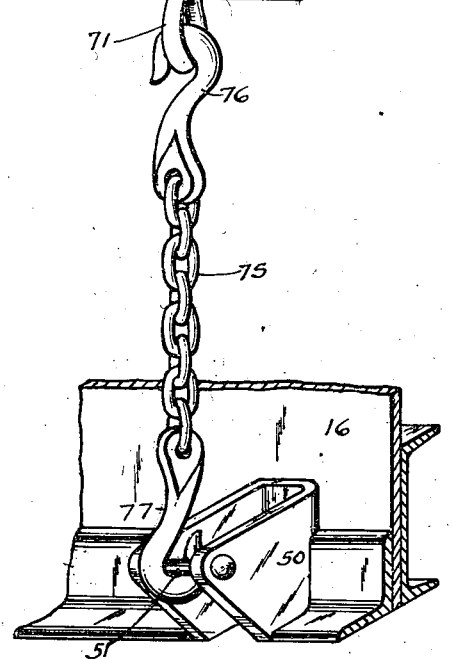

Referring now to the drawings, Fig. 1 is a diagrammatic view, in the nature of an elevation showing a brick kiln with raising and transporting mechanism for stacking the containers at the brickyard; Fig. 2 is a side elevation of a railway car having the containers stacked in superimposed relationship; Fig. 3 is a side elevation of a truck, which is adapted to receive and transport face brick containers; Fig. 4 is a side elevation of a dump truck, which is adapted to receive and transport common brick containers; Fig. 5 is a diagrammatic plan view of an arrangement of car trucks and turn-table crane equipment adjacent the car unloading terminal; Fig. 6 is a vertical section adjacent a corner of the container as indicated by the line 6—6 in Figs. 7 and 10; Fig. 7 is a horizontal section taken on the line 7—7 in Fig. 6; Fig. 8 is a top plan view of one of the container centering members on the car floor; Fig. 9 is a vertical section taken on the line 9—9 in Fig. 8; Fig. 10 is a top plan view of a container, showing part of the floor broken away to illustrate the frame construction therebeneath; Fig. 11 is a perspective view of a container, which is adapted for handling face brick; Figs. 12 and 13 are vertical sections taken on the correspondingly numbered lines in Fig. 10; Fig. 14 is an enlarged perspective view of part of a container adjacent the portion that is adapted to receive the load engaging hook; Fig. 15 is a side elevation of a container designed for common brick; Fig. 16 is a perspective view of a corner bracket which is adapted to be fastened either onto a railroad car or truck floor for centering the corners of one of the brick containers; Fig. 17 is a similar centering block that is adapted for use adjacent the end of the tail gate of the container for common brick; Fig. 18 is a perspective view of the container for common brick, showing the tail gate construction; Fig. 19 is a section taken on the lines 19—19 in Fig. 18; Fig. 20 is a perspective view of part of a face brick container adjacent the portion that is adapted to be engaged by the load lifting hook; Fig. 21 is an illustrative view of means of attaching a lifting cradle, having depending shackles, to a brick container; Fig. 22 is a diagrammatic plan of a station arrangement having straightaway cranes without the turn-table feature.

In Fig. 1, the brick kiln is designated at 10, while 11 indicates a set of railway tracks, which extend in front of the kiln and beneath a crane runway 12. A hand car 13 is adapted to move along the trackway and to support a single brick container 14. A crane 15 may be utilized for raising the containers from the car and stacking them in superimposed relationship, as is indicated at 16, until they are ready for shipment. The containers are stacked in accordance with the character of brick therein, so that each pile comprises the same kind of brick.

When an order is received for a single shipment of various kinds of brick to a different city, the containers are transported from the storage pile and deposited onto a railway car 17, as is shown in Fig. 2. Such car is provided either with outside positioning devices 18 that are adapted to engage the outside corners of the lowermost container, or is provided with inside positioners 20 that are adapted to engage complementary shaped pockets 21 on the underside of the containers. The inside positioners comprise a suitable projection 20 which is shown as being conical in form and as being mounted on a plate 22, which in turn is adapted to be fastened by securing members 23 to the car floor. The pockets 21 are shown as conical recesses in plates 24 that are fastened onto the bottom of the container frame. Such positioning units are spaced adjacent the corners of the container and also adjacent the center of the container if desired, as is shown in Fig. 10.

The containers are also provided with suitable means to hold them in superimposed relationship, and to this end, I have shown the top flange of the side members as having spaced tongues 30, which are adapted to enter correspondingly shaped slots 31 in the bottom of the adjacent superimposed container. Thus, containers for common brick may be nested with each other, and also with those for face brick, without necessitating any particular attention by the party who is in charge of loading the car.

At the destination point, I provide a plurality of motor trucks with provision thereon for receiving the respective containers. For example, in Fig. 5 the trucks 35 and 36 are adapted to receive and transport face brick containers, while the truck 37 is adapted to receive and transport common brick containers. The last named truck is a dump truck and is therefore adapted to dump the contents of the container when the body is tilted and the tail gate 38 is opened. Trucks 35 and 36 differ only in the means for holding the container thereon. For example, the outside corner brackets are shown on the truck 35 while the inside positioning devices are shown on the truck 36. On the dump truck, the corner brackets 18 are placed adjacent the fixed end of the container, while the brackets 18a are placed against the tail gate end of the container. The last named brackets have one side shorter than the other to permit adequate clearance for pivotal movement of the tail gate. Regardless of the devices that are used, however, for locating the container, it is apparent that either form of container will be suitably held upon the truck.

To transport the containers to the trucks, I have indicated, in Fig. 5, the outline of an overhead crane 38, which is adapted to travel on tracks 39 and which is provided with a turn-table for turning the containers through ninety degrees to spot them on the trucks. Thus, when a car arrives, a number of different trucks may be in readiness to receive the containers and the change from car to truck may be quickly made, and the containers may be immediately handled either to a storage yard or to the place of use. Thereupon, empty containers may be loaded into the car and the car released for the return trip to the brickyard.

Where it is desired to avoid the necessity of a turntable crane, one may employ such a station arrangement such as illustrated in Fig. 22, where the overhead trackways 60 are adapted to carry a simple bridge crane, illustrated by broken lines 61, having depending flexible members adapted to be connected at four points with the container. This view illustrates trucks 35, having corner positioners 18; it illustrates, also, a flat car 17, carrying two stacks of trays 16, which a single crane may lift successively on a pair of trucks by shifting the flat car; or two cranes may handle the bodies individually and place them on the trucks beneath the respective craneways.

With the station arrangement of either Fig. 5 or Fig. 22, specially equipped railway cars may be kept in constant use and thus demurrage charges and expenses may be reduced to a minimum.

The containers that are adapted to be used for transporting common brick preferably have the side walls 40 and one end wall 41 rigidly and permanently attached to the bottom frame, while the other end wall 38 includes a tail gate that is hinged to the top at 42. The containers that are used for face brick however, have side walls 45 and end walls 46 that are rigidly fastened together, but are removably positioned as a unit upon the platform. For this purpose I show members 47 rigidly fastened in ribs 48 of the side walls and slidably fitting in ribs 49 of the bottom frame. Thus, the walls may be lifted off the frame and the brick rendered accessible for removability by hand.

To facilitate lifting of the containers, I have shown each as being equipped with U-shaped brackets 50 (Figs. 14, 18, 20, 21) which extend laterally from the sides thereof and that are provided with aligned openings through which a pin 51 may extend. This provides a shoulder for receiving a lifting hook such as shown in broken lines at 52. If the crane carries a cradle or suspended frame, as illustrated at 70 in Fig. 21, having depending loops or shackles 71, this may be readily attached to the pins 51 of the container, by an intermediate chain or bar 75 having hooks 76 and 77 at its opposite ends facing directions of right angles to each other. In addition, handles 53 may be utilized for lifting the frame off the platform of the face brick containers.

An important advantage of the present invention is the fact that brick may be shipped between different cities over railroads without necessitating long truck hauls during the day and without requiring the brick to be handled individually at the transfer points. This system effects marked economies, as it possesses the advantages of truck haulage, without disturbing the relationship of the brick within the container until it is delivered at the job.

I claim:

1. A container for brick and the like, comprising a platform upon which bricks are adapted to be stacked, means disposed on the sides of the platform for engaging a hoisting mechanism, a frame resting on the platform, and having the side walls thereof disposed inside of the limits of the hoist engaging means, whereby lifting stresses are borne substantially entirely by the platform, each frame being adapted to support a loaded platform, and there being means on the frame adapted to interlock with a surmounting platform respectively for holding the platform and frame in proper operating relationship.

2. A container for brick and the like, comprising a platform upon which bricks are adapted to be stacked, means disposed on the sides of the platform for engaging a hoisting mechanism, a frame resting on the platform, and having the side walls thereof disposed inside of the limits of the hoist engaging means, whereby lifting stresses are borne substantially by the platform, and there being coacting projections and pockets on the frame and platform respectively for holding the platform and frame in proper operating relationship.

3. A container for bricks and the like, comprising a portable platform upon which bricks are adapted to be stacked, a frame comprising side and end walls connected together and all detachably resting on the platform and disposed adjacent the marginal edges thereof, interlocking means preventing horizontal movement in any direction between the frame and platform, hoist engaging members mounted on the platform and adapted to raise the platform and the load without transmitting load stresses to the frame, and other hoist engaging means on the frame, whereby the frame may be lifted as a unit from the platform without disturbing the relationship of the bricks to the platform.

4. An open top container for bricks and the like having a base portion and having four side members rigidly connected with each other, said side members resting on the base portion but being detachably connected with the base portion, said container having means for interlocking with a similar unit above or below, and means for attaching hoist mechanism independently to the base portion and to the side members.

BENJAMIN F. FITCH.